April 18, 1939.  E. R. MAURER  2,154,575
DRIVING MECHANISM
Filed Jan. 18, 1934  3 Sheets-Sheet 1
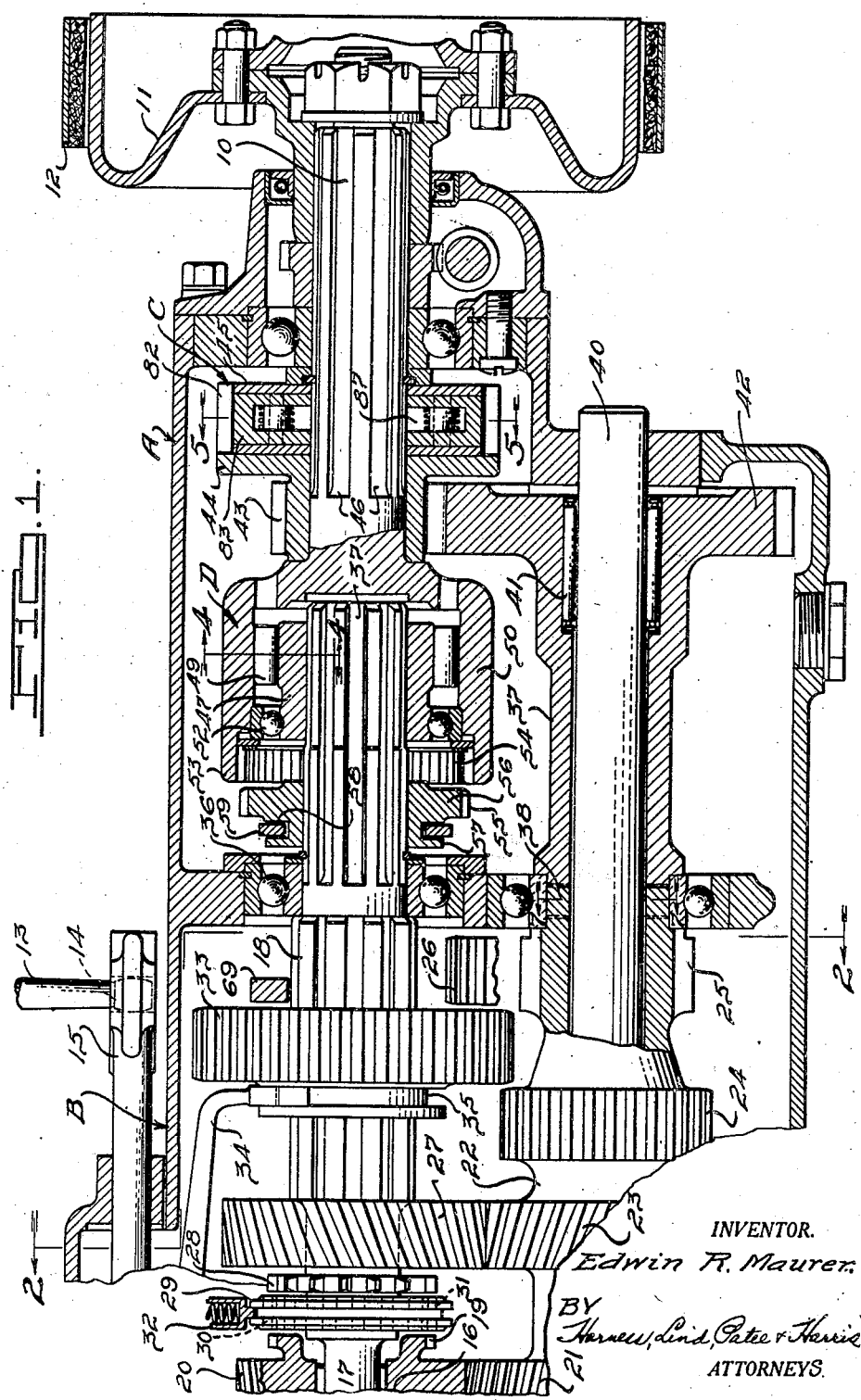
INVENTOR.
Edwin R. Maurer.
BY
Harness, Lind, Patee & Harris
ATTORNEYS.

April 18, 1939.   E. R. MAURER   2,154,575
DRIVING MECHANISM
Filed Jan. 18, 1934   3 Sheets-Sheet 2
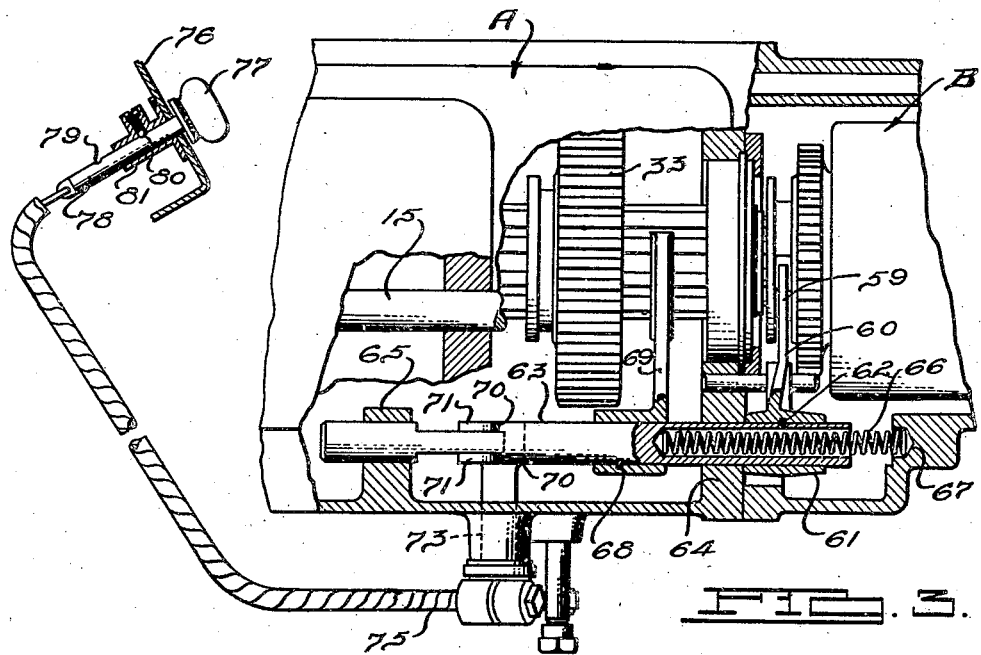
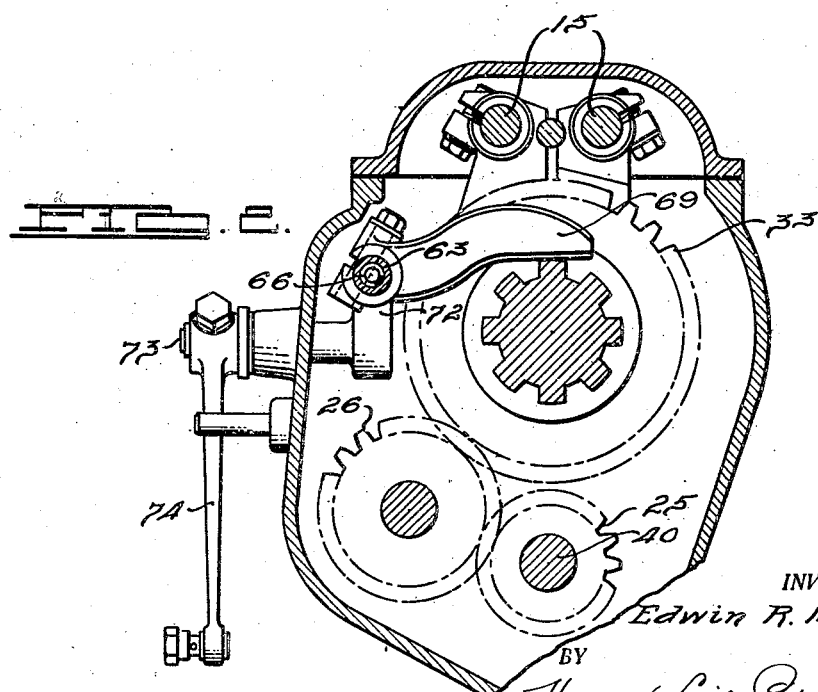
INVENTOR.
Edwin R. Maurer.
BY
Harness, Dind, Patee & Harris,
ATTORNEYS April 18, 1939.  E. R. MAURER  2,154,575
DRIVING MECHANISM
Filed Jan. 18, 1934   3 Sheets-Sheet 3
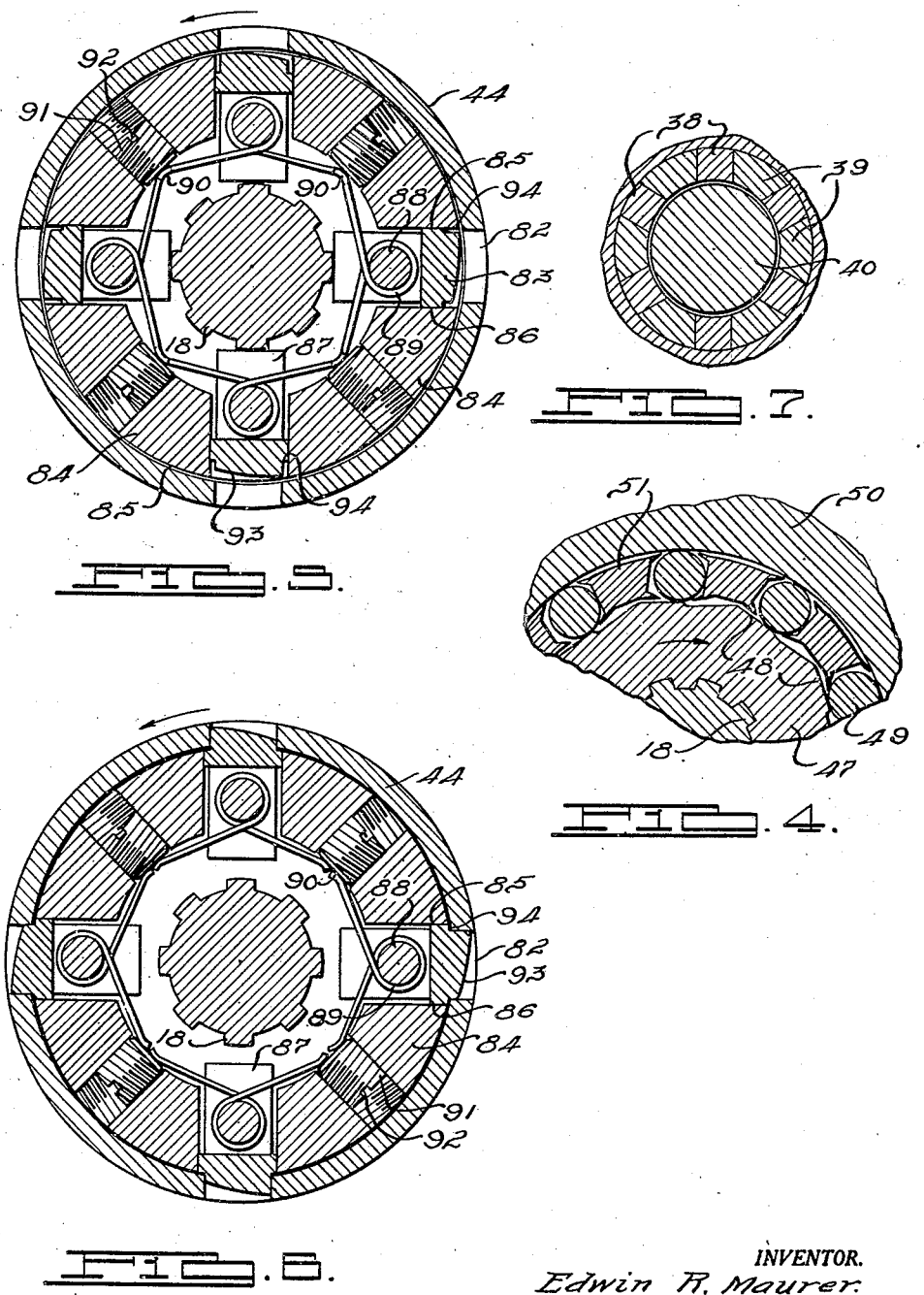
INVENTOR.
Edwin R. Maurer.
BY
Harness, Lind, Patee & Harris
ATTORNEYS Patented Apr. 18, 1939

2,154,575

UNITED STATES PATENT OFFICE 2,154,575

DRIVING MECHANISM

Edwin R. Maurer, Detroit, Mich., assignor to Chrysler Corporation, Detroit, Mich., a corporation of Delaware Application January 18, 1934, Serial No. 707,092

24 Claims. (Cl. 74—336)

This invention relates to driving mechanisms and refers more particularly, in one embodiment thereof, to improvements in driving mechanisms for motor cars or vehicles, especially where it is desired to vary the driving speed ratio between the vehicle engine or prime mover and the propelling ground wheels.

One object of my invention resides in the provision of an improved driving mechanism adapted, under predetermined desired conditions, to automatically effect the drive for the vehicle. My driving mechanism is preferably adapted for use in connection with a speed ratio changing transmission of any desired type, and is adapted to establish an auxiliary driving speed ratio for the vehicle, such as an overdrive ratio for example.

A further object of my invention resides in the provision of an improved driving or speed ratio changing mechanism adapted to automatically respond in its actuation to predetermined desired conditions of operation of the vehicle. Thus, by way of example, I have provided an overdrive which is automatically effective when the vehicle attains a predetermined speed so that, on reaching this critical speed, the overdrive becomes effective and on falling below this critical speed the overdrive becomes ineffective.

In carrying out the aforesaid objects of my invention I have provided an improved form and arrangement of an auxiliary driving mechanism which, where an overdrive speed ratio is desired for the vehicle, is driven, when inoperative as a drive, at a speed greater than that of a shaft or other part cooperating therewith and driven from the engine. Ordinarily, I prefer to arrange my auxiliary driving mechanism between driving or driven shafts or other parts respectively responsive in their actuation to the speeds of the engine and vehicle driving speeds, the auxiliary driving mechanism being thus driven, when inoperative, from the driving shaft and at a speed greater than that of the driving shaft by the amount or ratio of overdrive desired.

In order to effect the aforesaid automatic engagement and disengagement of the drive through the auxiliary driving mechanism, I have provided a clutch which will automatically connect and release the clutch control parts of the auxiliary drive under predetermined desired conditions of relative speeds of the engine and vehicle, or driving and driven shafts. This automatic clutch is preferably of the type having a cage or core carrying one or more pawls or dogs responsive to centrifugal force at the desired critical speed for movement of the pawls into clutching relationship with a cooperating or companion clutch member or shell formed with the suitable pawl engaging slots or openings, the pawl carrying cage being driven with either the engine driving shaft or the vehicle driven shaft, and the slot carrying shell being driven with the other of these shafts. If desired, other types of clutches may be used to control the auxiliary driving mechanism within the broader aspects of my invention.

A further object of my invention resides in the provision of what may be termed primary driving means in addition to said auxiliary driving mechanism for driving the vehicle independently thereof, and in an improved form and arrangement, such means preferably being under manual control so that the drive may be established independently of the auxiliary drive and automatic clutch associated therewith. The primary driving means may thus provide the normal driving medium between the engine and vehicle drive either throughout the entire speed range of the vehicle or up to the aforesaid critical speed at which time the automatic clutch transfers the drive to and through the said auxiliary driving mechanism.

Another object of my invention resides in the provision of an auxiliary-driving mechanism of the character in which a relatively small number of gears are required, the mechanism occupying a relatively small space and being simple in construction and capable of manufacture at small cost. Thus, according to one aspect of my invention, I have provided an improved form and arrangement of auxiliary driving mechanism embodying a countershaft intermediate the power driving shaft and the driven shaft, the countershaft driving one of the clutching parts of the automatic clutch. A further feature of this phase of my invention resides in the provision for driving the countershaft or other auxiliary driving mechanism from a part of the speed ratio changing transmission which is driven from and with the engine driving shaft. Thus, for example, the usual transmission countershaft of the present well-known form of transmission may be extended beyond its customary length to provide the countershaft for the auxiliary driving mechanism. By utilizing a transmission part driven from the engine driving shaft I have simplified the auxiliary driving mechanism and reduced the cost thereof.

A still further object of my invention resides in the provision of an improved form and arrangement of overrunning or free wheeling clutch as a part of the aforesaid primary driving means. With such novel arrangement, the vehicle may overdrive the engine, the auxiliary and primary drives and parts associated therewith being arranged so that when engagement of the automatic clutch takes place to drive the vehicle through the auxiliary driving mechanism, the overrunning clutch is preferably thereby rendered simultaneously ineffective, the overrunning clutch and primary driving means being automatically effective when the automatic clutch releases its drive, as when the vehicle speed drives below the predetermined desired critical speed.

An additional object of my invention resides in the provision of improved means for manually rendering the aforesaid overrunning clutch ineffective either throughout the vehicle speed range or above or below the critical speed at which operation of the automatic clutch takes place.

Another object of my invention resides in the provision of improved means responsive to manually controlled manipulation of the said speed ratio changing transmission into the transmission setting for reversing the normal direction of vehicle drive, for automatically locking out or rendering ineffective the said overrunning clutch, this means being preferably in addition to the aforesaid manually controlled means for the overrunning clutch or automatic clutch or both as may be desired in any particular installation.

Further objects of my invention reside in the provision of an improved driving mechanism and in the novel combination and arrangement of parts thereof more particularly hereinafter described and shown in one detailed embodiment in order to illustrate the details and principles of my invention, reference being had to the accompanying drawings, in which:

Fig. 1 is a sectional elevational view through my power transmission mechanism.

Fig. 2 is a sectional elevational view showing the reverse gearing of the speed ratio changing transmission illustrated with my invention, the section being taken along the staggered line 2—2 of Fig. 1.

Fig. 3 is a plan view of the transmission as shown in Fig. 1, the casing being broken away to illustrate the reverse gearing and associated mechanism.

Fig. 4 is a sectional elevational view through a portion of the overrunning or free wheeling clutch, the section being taken along the line 4—4 of Fig. 1.

Fig. 5 is a sectional view through the automatic clutch, the section being taken along the line 5—5 of Fig. 1.

Fig. 6 is a view corresponding to Fig. 5 illustrating the engaged or operating position of the clutch parts.

Fig. 7 is a detailed sectional view through the countershaft, the section being taken along the line 7—7 of Fig. 1.

In the drawings I have illustrated my driving mechanism A interposed between speed ratio changing transmission B and the driven shaft 10, the latter extending rearwardly to drive the rear wheels (not shown) of the motor car or vehicle in the usual well-known manner, it being understood that I have elected to show my invention in association with a motor vehicle drive, although my invention in its broader aspects is not necessarily limited thereto. Furthermore, my driving mechanism may be used to advantage in various other points in the line of general power transmission between the vehicle engine and the driven wheels, or between driving and driven means such as shafts or other types of devices. If desired, shaft 10 may transmit its drive through the usual propeller shaft brake drum 11, the latter having the usual brake band 12 associated therewith.

The transmission B may be of any suitable type such as the conventional selector type operated by the well-known shift lever 13, the lower end 14 of which is illustrated in Fig. 1 as engaging the usual selector controls 15 whereby the various adjustments may be made to the transmission in order to provide the speed ratios in the line of drive through the transmission. Inasmuch as transmission B may for the most part be of general conventional construction and operation, I have shown only a portion of the gearing and controls of this transmission in Figs. 1, 2, and 3.

The power coming from the usual engine or other prime mover (not shown) drives transmission B by a driving shaft 16 piloting the forwardly extending relatively rotatable end 17 of the transmission driving shaft 18. The driving shaft 16 has clutch teeth 19, and keyed to this shaft is the transmission driving pinion 20 constantly meshing with gear 21 driving transmission countershaft 22. This countershaft is provided with the second speed constant mesh gear 23, a first speed gear 24, and a reverse gear 25 constantly meshing with the usual reverse idler pinion, a portion of which is shown at 26.

Meshing with gear 23 is a gear 27 constantly driven thereby, this gear being freely rotatable on shaft 18 and having clutch teeth 28. Splined to shaft 18 is a shaft collar 29 having two internal angular series of teeth 30 and 31 respectively engageable by shift lever 13 and arm 32 connected thereto, with teeth 19 or 28. When teeth 19 are engaged in this manner, shaft 18 is directly driven with driving shaft 16. When teeth 28 are engaged, shaft 18 is driven in the second speed ratio by gears 20, 21, 23 and 27.

Splined on shaft 18 is a shiftable gear 33 adapted to be shifted by lever 13, arm 34 and collar 35. When gear 33 is shifted forwardly to mesh with gear 24, the shaft 18 is driven in the low or first speed gear ratio provided by the gear train 20, 21, 24 and 23. When gear 33 is shifted rearwardly to mesh with gear 26, the shaft 18 is reversed from its normal direction of drive by reason of the gear train 20, 21, 25, 26, and 33. Thus, by appropriate actuation of the shift lever 13, gears 33 and 26 may be engaged so as to reverse the drive, it being understood that other manipulations of shift lever 13 are adapted to selectively produce other desired speed ratio changes in the normal direction of rotation for driven shaft 10.

The power is taken from transmission B by the power driving means or shaft 18 rotatable in a bearing 36, the shaft having a portion extending rearwardly into the driving transmission A, this extending portion of the shaft being provided with splines 37.

My driving mechanism B provides, among other things, an auxiliary driving means or mechanism between the driving and driven shafts 18 and 10, respectively, this driving means being preferably of a construction adapted to provide a speed ratio between the shafts of an overdriving character whereby shaft 10 may, under certain conditions hereinafter described, be driven from the driving shaft at a speed greater than a direct drive between these shafts, it being understood that the engine will, in such instances, be relatively slowed down with respect to its normal speed of actuation for a given speed of vehicle travel. If desired, the mechanism A may be arranged to provide an underdrive instead of an overdrive, although I prefer to arrange the gearing for an overdrive of the driven shaft 10.

The transmission countershaft 22 has a rearward portion 37' driven therewith as an integral part thereof or connected thereto by interlocking teeth 38 and 39 carried by the countershafts 32 and 37', respectively, as best shown in Figs. 1 and 7. An axle 40 journals the countershafts by suitable bearings, one being shown at 41.

Countershaft 37' of my auxiliary driving mechanism has a gear 42 formed therewith and meshing with gear 43 loosely journaled on driven shaft 10. This gear 43 is formed with a clutching member or shell 44 of the automatic clutch C, the companion clutching member or pawl carrying cage 45 being at all times connected to rotate with shaft 10 by reason of the splines 46 thereof. Clutch C is preferably of the automatic type so as to be responsive in its engagement and disengagement of clutching members 44 and 45 to the relative speed of the driving shaft 18 and the driven shaft 10 as will be more apparent hereinafter.

I preferably incorporate in my driving mechanism as a part of the primary driving means between driving shaft 18 and driven shaft 10 an overrunning or free wheeling clutch D, best shown in Figs. 1 and 4. This clutch may in itself be of any suitable form, the illustration showing a conventional device in which the inner cam member 47 is driven by the splines 37 of shaft 18, the cam faces 48 being engaged by cylinders 49 so that by the driving rotation of shaft 18, the high sides of cam faces 48 will wedge the cylinders 49 between cam member 47 and the outer cylindrical driven member 50 of the overrunning clutch to establish a direct drive thereto. The usual spacers 51 maintain the cylinders in spaced position, it being apparent that whenever the engine or driving shaft 18 slows down, the vehicle and driven shaft 10 may, by reason of clutch D, overrun the driving shaft, other conditions permitting such action as will be presently apparent.

The cylindrical portion 50 of the overrunning clutch D is formed as a forward extension of driven shaft 10, this cylindrical portion being centered with and forming a housing around the rear end of driving shaft 18, a bearing 52 being interposed between the cam member 47 and the aforesaid cylindrical portion. This portion has a forward extension 53 provided with an annular series of internal teeth or jaws 54 complementary to corresponding teeth 55 of the clutching device 56 splined to shaft 18, the arrangement being such that when the clutch 56 is shifted to the right, as viewed in Fig. 1, teeth 54 and 55 will engage so as to lock out or render the overrunning clutch D ineffective and inoperative. In such instance, it will be apparent that direct drive is established between driving shaft 18 and driven shaft 10 through these engaging teeth and the outer portion 50 of the overrunning clutch D.

The clutch 56 is provided with a collar 57 having an annular groove 58 engaged by a yoke 59, best shown in Fig. 3. This yoke extends laterally through an arm 60 to a hub 61 keyed or otherwise fixed at 62 to a shiftable rod 63 adapted to reciprocate in guides 64 and 65 provided by the casing of the transmission B. The rear end of rod 63 is bored out to receive a spring 66 reacting against a fixed abutment 67, this spring 66 acting to normally move rod 63 to the left, as viewed in Fig. 3, to position the parts associated therewith as illustrated in Figs. 1, 2, and 3 of the drawings.

Carried by rod 63 and also keyed thereto at 68 is an arm 69 extending laterally inwardly of transmission B, this arm being normally spaced from reversing gear 33 but being adapted for engagement therewith during movement of this reversing gear into its position of engagement with gear 26 for establishing the aforesaid reverse drive. The arrangement is such that when gear 33 is shifted as aforesaid to its position for establishing the reverse drive, arm 69 will be engaged by gear 33 and moved to the right as viewed in Figs. 1 and 3, thereby also moving rod 63 and yoke 59 to the right for shifting the clutch 56 along splines 37 of the driving shaft 18 to lock out the overrunning clutch D as aforesaid.

In addition to the aforesaid manually operated means for shifting the position of the clutch 56 in response to a setting of the reverse gearing of transmission B, I have also provided a further manually controlled means for shifting the clutch 56 independently of the movement thereof under the influence of the reverse setting of the transmission. To this end the rod 63 is formed with shoulders 70 engaged by forks 71 of the upwardly extending arm or lever 72, this lever being pivotally mounted on a pin 73, the latter being provided with a downwardly extending arm 74 adapted for movement by suitable linkage such as the Bowden wire 75. This wire, as diagrammatically illustrated in Fig. 3, extends for convenient manipulation by the vehicle driver, such position being indicated by the vehicle dash 76 which mounts a handle or knob 77 connected to the other end of the Bowden wire 75. The handle 77 is adapted for movement by the hand of the vehicle driver, the knob being guided from its normal position, illustrated in Fig. 3, to a position in spaced relationship from dash 76, in which extended position the guide portion 78 of the handle will register a notch 79 thereof with spring pressed ball 80 carried by guide block 81, the ball 80 and the notch 79 cooperating to advise the operator of the proper position of handle 77, and also to determine and limit the handle movement for effecting the desired swinging of lever 72 about its pivot 73. This swinging movement of the lever will move rod 63 against spring 66 to shift the clutch 56 independently of movement of the reversing gear 33 as will be readily apparent from Figs. 1 and 3 of the drawings.

Referring now to this automatic clutch C which is best shown in Figs. 1, 5, and 6, the shell 44 is formed with a circumferential series of spaced openings or slots 82 adapted to receive the pawls or dogs 83 of the cage 45. This cage is provided with diametrically arranged lateral extensions or pawl guides 84, these extensions having arcuate faces 85 fitting within shell 44. Extensions 84 have pawl engaging faces 85 and 86 of adjacent extensions 84 for slidably receiving the aforesaid pawls 83, each pawl having a recess 87 into which a pin 88 projects. The pawls are limited in their inward movement by shaft 10, as best shown in Fig. 5.

In order to normally urge the pawls inwardly of the pawl cage or core so as to position the parts as shown in Fig. 5, I have provided springs 89. Each spring is coiled a number of times around its associated pin 88 and extends therefrom in generally opposite directions within aforesaid extensions 84, each spring having terminal portions 90 acting on the adjustable members or abutments 91 threaded into extensions 84, these threaded members 91 having tool receiving slots 92 permitting their ready adjustment to vary the spring tension.

The slots 82 of shell 44 are suitably arranged so that diametric pairs of slots will simultaneously register with the pawls 83 so as to receive these pawls to establish the operative or engaged condition of clutch C.

It will be noted that springs 89 may be readily adjusted from without the clutch by aligning each of the threaded members 91 with a slot 92, the clutch being disengaged, whereupon abutments 91 may be rotated to effect the desired adjustment in the tension of the spring governing the action of the pawls.

The outer ends of pawls 83 are preferably provided with cam faces 93 acting on the inner edges of slots 82 to progressively release the pawls outwardly under the action of centrifugal force when the clutch shell and cage are rotated substantially together at a predetermined desired speed. When the pawls move outwardly in slots 82, such movement is limited by engagement of pawl shoulders 94 with the portions of shell 44 adjacent slots 82, as shown in Fig. 6.

In operation of the power transmitting mechanism with the parts positioned as in Fig. 1 but with transmission shift collar 29 engaging teeth 19 for normal operation, the engine will drive the shaft 18 and hence the driven shaft 10 to drive the vehicle forwardly in direct drive, so far as the driving and driven shafts 18 and 10, respectively, are concerned. This direct drive takes place from shaft 18, through the free wheeling clutch D and thence to driven shaft 10. When the vehicle tends to overrun the engine, such action may take place by reason of clutch D. During this direct drive the pawls 83 will be driven at the speed of shaft 10 and driving shaft 18, while the shell 44 will be rotated by gear 43 at a speed faster than that of the driven shaft 10 and driving shaft 16, by reason of the gear ratio increase through the countershaft gear train 20, 21, 42, and 43.

By way of illustrating one manner of operation of my automatic clutch C, this clutch is illustrated as being adapted to automatically lock out or render the free wheeling clutch D ineffective, and to simultaneously drivingly connect shaft 10 with gear 43 at a predetermined speed of rotation of shaft 10, and hence a predetermined speed of vehicle drive. When such clutching action takes place, the shaft 10 is driven from gear 43 as aforesaid by reason of the countershaft gear train from the shaft 16 or shaft 18 locked thereto in direct drive adjustment of transmission shift collar 29. This drive provides an overdrive or a higher speed of the driven shaft 10 than that of the driving shafts 16 and 18.

An overdrive is ordinarily desirable at only relatively high speeds of vehicle travel, and hence, by a suitable setting of the pawl springs 89, the pawls may be held inoperative against the influence of centrifugal force acting to move the pawls outwardly until the desired predetermined critical speed has been reached. Assuming, by way of example, that such automatic overdrive is desired at approximately 50 miles per hour of vehicle travel, then when the vehicle is being driven at this speed, the pawls are urged outwardly by centrifugal force to engage slots 82 of shell 44 when rotation of the pawl cage and shell becomes substantially uniform. Under the assumed conditions, springs 89 may be set so that the pawls tend to fly outwardly at a speed of shaft 10 corresponding to 50 miles per hour of vehicle travel, the pawls being restrained from moving outwardly until the clutch parts are synchronized, by reason of the countershaft gear train which drives the slots faster than the pawls which are driven directly from driven shaft 10. Owing to the difference in rotational speeds of the slots and pawls, these parts pass each other with such rapidity that the pawls do not have time to move outwardly to engage the slots and the parts continue to slip until the operator momentarily releases or diminishes the power of the engine applied to shaft 16 so as to permit the shell 44 to decelerate. In decelerating, the shell 44 obviously very quickly drops to the speed of the pawl cage 45, momentarily synchronizing the pawls with a pair of diametrically arranged slots 82, the pawls thereupon being guided out, during rotation thereof, by cam faces 93 for effecting initial engagement of the pawls in the slots. Once engaged, the centrifugal force acting on the pawls carries them outwardly for fully engaging the slots of shell 44, and the overdrive immediately takes place with the free wheel clutch D locked out as aforesaid. As long as the engine drives the shell at or above the aforesaid overdrive speed, with the pawls 83 engaged in slots 82, the clutch C will remain engaged. However, when the vehicle slows down below the aforesaid 50 miles per hour in the assumed illustration, the pawls 83 will be urged to their retracted or normal position of Fig. 5, such retraction taking place just as soon as the friction of the drive is relieved or reversed between the sides of the slots and pawls. Thus, when the vehicle driver momentarily releases the usual accelerator pedal to cause the vehicle to drive the engine, this reversal of drive permits retraction of the pawls and the power transmission is then again operating without the overdrive and through the free wheeling clutch D.

When it is desired to drive the vehicle in reverse, shifter 13 is moved to release any gear ratio previously established and is then moved to shift gear 32 into engagement with the reverse idler gear 26. This causes rearward movement of arm 68 to move clutch 56 to the right, as viewed in Fig. 1, so as to engage teeth 54 and 55 to lock out the free wheel clutch D. This reverse drive thus passes from shaft 18 to clutch 56, driven member 50, and thence to the driven shaft 10, it being understood that the driven shaft 10 has its rotation reversed by the reversing mechanism of the transmission.

The clutch 56 may also be actuated to lock out the overrunning clutch D by shifting rod 63 independently of movement of gear 33, by reason of the handle 77. When this handle is pulled to engage notch 79 with ball 80 the overrunning clutch is locked out, but it will be noted that the handle 77 is thus operated only when the automatic clutch C is disengaged or declutched to avoid clashing of teeth 54 and 55.

I desire to point out that instead of driving the slot carrying shell 44 from the drive shaft 16 and hence from the engine, and the pawl cage 45 directly from the driven shaft 10, such parts may be readily reversed, if desired, so as to drive the pawl cage directly from the engine and the slots from the vehicle or driven shaft 10. The illustrated arrangement is preferred, however, where my automatic clutch is used in an overdrive mechanism, since the engine continues to drive at the overdrive speed from the time when the pawls are engaged in the pawl slots, viz., at a speed slower than in direct drive for the same vehicle speed. With the suggested reversal of clutch parts, the engine would have to operate considerably faster, by the overdrive ratio, than the driven shaft, to speed up the slot carrying member, and then by slowing down the engine momentarily to reduce the speed of the pawl cage to that of the slot carrying member, the pawls will engage the slots. In such instance, it is therefore apparent that the engine would have to drive at a speed greater than its speed for the overdrive setting of the pawls, in order to establish the proper conditions for effecting actuation of the automatic clutch C.

I do not limit my invention, in the broader aspects thereof, to the particular combination and arrangement of parts shown and described for illustrative purposes, since various modifications will be apparent within the teachings of my invention as defined in the appended claims.

What I claim is:

1. In a driving mechanism for a motor vehicle, means including a transmission adapted to drive the vehicle at different speed ratios, means driven by said driving means, said transmission having a countershaft, auxiliary driving means for driving said driven means from said countershaft, said auxiliary driving means including a speed responsive clutch, an overrunning clutch between said driving means and said driven means, and manually controlled means including engageable clutch members respectively drivingly connected to said driving and driven means for simultaneously rendering said overrunning clutch and said speed responsive clutch ineffective, said manually controlled means being adapted to establish a drive between said driving and driven means.

2. In a vehicle driving mechanism, a power driving shaft, a driven shaft, a free wheeling clutch having driving and driven parts thereof adapted to directly drivingly connect said shafts and to permit said driven shaft to overrun said driving shaft, means including a countershaft for overdriving said driven shaft with respect to said driving shaft, said overdriving means acting on said driven shaft beyond said free wheeling clutch relatively to said driving shaft, a clutch controlling the drive from said overdriving means to said driven shaft, an engine drive shaft, and means including said countershaft for transmitting a variable speed ratio drive between said engine drive shaft and said power driving shaft.

3. In a power drive for a motor vehicle driving means, second driving means including a driving shaft adapted to be driven from the first said driving means, third driving means including a driven shaft adapted to be driven from said driving shaft for transmitting a drive therefrom to drive the vehicle, said driving and driven shafts being co-axially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means including a countershaft offset to one side of one of said shafts for drivingly connecting one of said clutching structures to one of said driving means, and means for drivingly connecting the other of said clutching structures to another of said driving means, one of said clutching structures being drivingly connected to said driven shaft through one of said driving connecting means, one of said driving connecting means including a gear train, said clutching structures being driven at relatively different speeds when the driving shaft drives the driven shaft through said overrunning clutch.

4. In a power drive for a motor vehicle driving means, second driving means including a driving shaft adapted to be driven from the first said driving means, third driving means including a driven shaft adapted to be driven from said driving shaft for transmitting a drive therefrom to drive the vehicle, said driving and driven shafts being co-axially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutch structure for rotation concentrically with said shafts, a second clutching structure having a centrifugal force actuated pawl adapted for engagement in said slot to positively couple said clutching structures when the rotational speeds thereof are substantially the same, means for drivingly connecting one of said clutching structures to said driven shaft, and means including a gear train having a countershaft offset to one side of one of said shafts for drivingly connecting the other of said clutching structures directly to the first said driving means, whereby the clutching structure which is drivingly connected to said driven shaft is rotated at a speed less than that of the other of said clutching structures when the driving shaft drives the driven shaft through said overrunning clutch.

5. In a power drive for a motor vehicle, driving means, second driving means including a driving shaft adapted to be driven from the first said driving means, third driving means including a driven shaft adapted to be driven from said driving shaft for transmitting a drive therefrom to drive the vehicle, said driving and driven shafts being co-axially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means including a countershaft offset to one side of one of said shafts for drivingly connecting one of said clutching structures to one of said driving means, and means for drivingly connecting the other of said clutching structures to another of said driving means, one of said clutching structures being drivingly connected to said driven shaft through one of said driving connecting means, one of said driving connecting means including a gear train, the clutching structure which is drivingly connected to said driven shaft being rotated at a speed less than that of the other of said clutching structures when the first said driving means drives the driven shaft through said driving shaft and said overrunning clutch, said overrunning clutch releasing the drive therethrough on retardation of the first said driving means for reducing the speed of the driving shaft to substantially synchronize the rotational speeds of said clutching structures.

6. In a drive for a motor vehicle having driving means including a driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element adapted to clutch with the other in response to substantially synchronized rotation of said clutching structures at or above a predetermined speed to provide a releasable positive driving connection therebetween, means for driving one of said structures from said driven shaft for rotation at the same speed therewith, means including a gear train for driving the other of said structures from said driving means whereby said structures rotate at different speeds when said driven shaft is driven through said overrunning clutch, clutching members respectively drivingly connected to said driving and driven shafts and adapted when engaged to provide a two-way drive between said shafts, one of said clutching members being adapted for manual shifting relative to said clutching structures, and a plurality of manually controlled means selectively operable to shift the last said clutching member, said manually controlled means including a common operating element connected to the last said clutching member.

7. In a power drive for a motor vehicle, driving means, second driving means including a driving shaft adapted to be driven from the first said driving means, third driving means including a driven shaft adapted to be driven from said driving shaft for transmitting a drive therefrom to drive the vehicle, said driving and driven shafts being co-axially arranged for relative rotation, an overrunning clutch including inner and outer clutch members one of which is drivingly connected to said driven shaft and the other of which is drivingly connected to said driving shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with respect to said shafts, a second clutching structure having a centrifugal force actuated pawl adapted for engagement in said slot to positively couple said clutching structures when the rotational speeds thereof are substantially the same, means including a countershaft offset to one side of one of said shafts for drivingly connecting one of said clutching structures to one of said driving means, and means for drivingly connecting the other of said clutching structures to another of said driving means, one of said clutching structures being drivingly connected to said driven shaft through one of said driving connecting means, one of said driving connecting means including a gear train, said clutching structures being driven at relatively different speeds when the driving shaft drives the driven shaft through said overrunning clutch, and manually operable clutching means including clutching elements respectively drivingly connected to said driving and driven shafts for positively drivingly connecting said driving and driven shafts whereby to render said overrunning clutch inoperative.

8. In a vehicle drive, a speed ratio changing transmission having a power applying driving shaft and a power take-off driving shaft and a countershaft drivingly connected to said first driving shaft and adapted to drive said second driving shaft, an overdriving mechanism associated with said transmission and having a shaft aligned with said second driving shaft and adapted to be driven therefrom for driving the vehicle, an overrunning clutch including clutch portions respectively drivingly connected to said second driving shaft and to said driven shaft and adapted to transmit a direct one-way drive therebetween, speed responsive clutch means including driving and driven clutching structures adapted for clutching action in response to substantially synchronized rotation thereof at or above a predetermined speed, means including said countershaft for driving one of said structures from said first driving shaft, means for driving the other of said structures from said driven shaft, said driving means being adapted to drive said structures at relatively different speeds when said second driving shaft drives said driven shaft through said overrunning clutch, said clutching structures being adapted to establish a positive drive from said first driving shaft to said driven shaft through said countershaft driving means in response to overrun of the second said driving shaft by said driven shaft, and manually operable clutching means including clutching elements respectively drivingly connected to said driving and driven shafts for positively drivingly connecting said driving and driven shafts whereby to render said overrunning clutch inoperative.

9. In a vehicle drive, a speed ratio changing transmission having a power applying driving shaft and a power take-off driving shaft and a countershaft drivingly connected to said first driving shaft and adapted to drive said second driving shaft, an overdriving mechanism associated with said transmission and having a shaft aligned with said second driving shaft and adapted to be driven therefrom for driving the vehicle, an overrunning clutch intermediate said second driving and said driven shaft adapted to transmit a direct one-way drive therebetween, speed responsive clutch means including driving and driven clutching structures adapted for clutching action in response to substantially synchronized rotation thereof at or above a predetermined speed, means including said countershaft for driving one of said structures from said first driving shaft, means for driving the other of said structures from said driven shaft, said driving means being adapted to drive said structures at relatively different speeds when said second driving shaft drives said driven shaft through said overrunning clutch, said clutching structures being adapted to establish a positive drive from said first driving shaft to said driven shaft through said countershaft driving means in response to overrun of the second said driving shaft by said driven shaft, clutch teeth drivingly connected to said driven shaft, shiftable clutch teeth drivingly connected to said second driving shaft, and manually operable means for shifting said shiftable clutch teeth to engage the first said clutch teeth for drivingly connecting said second driving shaft and said driven shaft independently of said overrunning clutch.

10. In a power drive for a motor vehicle, driving means, second driving means including a driving shaft adapted to be driven from the first said driving means, third driving means including a driven shaft adapted to be driven from said driving shaft for transmitting a drive therefrom to drive the vehicle, said driving and driven shafts being co-axially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with respect to said shafts, a second clutching structure having a centrifugal force actuated pawl adapted for engagement in said slot to positively couple said clutching structures when the rotational speeds thereof are substantially the same, means including a countershaft offset to one side of one of said shafts for drivingly connecting one of said clutching structures to one of said driving means, means for drivingly connecting the other of said clutching structures to another of said driving means, one of said clutching structures being drivingly connected to said driven shaft through one of said driving connecting means, one of said driving connecting means including a gear train, said clutching structures being driven at relatively different speeds when the driving shaft drives the driven shaft through said overrunning clutch, manually operable means for reversing the normal direction of drive of said second driving means with respect to the first said driving means, and clutching means actuated by said manually operable means for positively drivingly connecting said driving and driven shafts whereby to render said overrunning clutch inoperative.

11. In a vehicle drive, a speed ratio changing transmission having a power applying driving shaft and a power take-off driving shaft and a countershaft drivingly connected to said first driving shaft and adapted to drive said second driving shaft, an overdriving mechanism associated with said transmission and having a shaft aligned with said second driving shaft and adapted to be driven therefrom for driving the vehicle, an overrunning clutch intermediate said second driving and said driven shaft adapted to transmit a direct one-way drive therebetween, speed responsive clutch means including driving and driven clutching structures adapted for clutching action in response to substantially synchronized rotation thereof at or above a predetermined speed, means including said countershaft for driving one of said structures from said first driving shaft, means for driving the other of said structures from said driven shaft, said driving means being adapted to drive said structures at relatively different speeds when said second driving shaft drives said driven shaft through said overrunning clutch, said clutching structures being adapted to establish a positive drive from said first driving shaft to said driven shaft through said countershaft driving means in response to overrun of the second said driving shaft by said driven shaft, manually operable means for adjusting said transmission for reversing the normal direction of drive of said second driving shaft with respect to said first driving shaft, and clutching means actuated by said manually operable means for positively drivingly connecting said second driving and said driven shaft whereby to render said overrunning clutch inoperative.

12. In a drive for a motor vehicle having driving means including a driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element adapted to clutch with the other in response to substantially synchronized rotation of said clutching structures at or above a predetermined speed to provide a releasable positive driving connection therebetween, means for driving one of said structures from said driving means, means for driving the other of said structures from said driven shaft, at least one of said driving means for said structures including a countershaft and connected gear train adapted to drive its associated clutching structure at a speed different from that imparted to the other of said structures when said driving shaft drives said driven shaft through said overrunning clutch, said countershaft being laterally offset from one of said shafts, manually operable means for reversing the normal direction of drive of said driving shaft, and clutching means actuated by said manually operable means for positively drivingly connecting said driving and driven shafts whereby to render said overrunning clutch inoperative.

13. In a drive for a motor vehicle having driving means including a driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element adapted to clutch with the other in response to substantially synchronized rotation of said clutching structures at or above a predetermined speed to provide a releasable positive driving connection therebetween, means for driving one of said structures from said driven shaft for rotation at the same speed therewith, means including a gear train for driving the other of said structures from said driving means whereby said structures rotate at different speeds when said driven shaft is driven through said overrunning clutch, manually operable means for reversing the normal direction of drive of said driving shaft, and clutching means actuated by said manually operable means for positively drivingly connecting said driving and driven shafts whereby to render said overrunning clutch inoperative.

14. In a vehicle driving mechanism power driving means, a multiple speed ratio changing transmission driven by said power driving means and having a power take-off driving shaft and a countershaft adapted to be driven by said power driving means, said driving shaft and said countershaft each having a driving extension projecting rearwardly beyond one end of said transmission, an auxiliary drive compartment extending rearwardly from said transmission and adapted to receive an auxiliary overdriving mechanism, said driving shaft extension projecting into said compartment at the forward end thereof, a driven shaft aligned with said driving shaft extension and extending rearwardly in said compartment from adjacent said driving shaft extension for driving the vehicle, an overrunning clutch including driving and driven clutch members respectively drivingly connected to said driving shaft extension and to said driven shaft for transmitting a direct one-way drive from said driving shaft extension to said driven shaft, an auxiliary overdrive gearing intermediate said countershaft extension and said driven shaft, said overdrive gearing spanning said overrunning clutch whereby to cause said driven member to overrun said driving clutch member when the drive passes through said overdrive gearing, said overdrive gearing including rotating clutching structures adapted to control the drive therethrough, one of said clutching structures having a centrifugal force actuated clutching element adapted to positively drivingly engage the other of said clutching structures in response to substantially equal rotation of the clutching structures at or above a predetermined speed.

15. In a drive for a motor vehicle having a power driving means and a shaft driven therefrom and adapted to drive said vehicle, a speed ratio changing transmission including a driving shaft intermediate said power driving means and said driven shaft, said transmission including means adapted to be manipulated for driving said driving shaft in a plurality of forward speed ratios and in reverse, overdriving means including a countershaft laterally offset from one of said shafts for driving said driven shaft from said power driving means at a speed greater than the speed of said driving shaft, a speed responsive clutch controlling said overdriving means and including positively engageable clutching structures respectively adapted for driving connection to said driven shaft and to said countershaft and power driving means at least when said structures are clutched, said speed responsive clutch being adapted to automatically drivingly connect said power driving means with said driven shaft through the intermediary of said countershaft, and means drivingly connected to said driving and driven shafts for selectively transmitting a releasable forward direct drive therebetween and a reverse drive therebetween in response respectively to manipulation of said transmission in effecting forward and reverse driving directions of said driving shaft.

16. In a drive for a motor vehicle having a power driving means and a shaft driven therefrom and adapted to drive said vehicle, a speed ratio changing transmission including a driving shaft intermediate said power driving means and said driven shaft, said transmission including means adapted to be manipulated for driving said driving shaft in a plurality of forward speed ratios and in reverse, overdriving means including a countershaft laterally offset from one of said shafts for driving said driven shaft from said power driving means at a speed greater than the speed of said driving shaft, a speed responsive clutch controlling said overdriving means and including positively engageable clutching structures respectively adapted for driving connection to said driven shaft and to said countershaft and power driving means at least when said structures are clutched, said speed responsive clutch being adapted to automatically drivingly connect said power driving means with said driven shaft through the intermediary of said countershaft, means drivingly connected to said driving and driven shafts for selectively transmitting a releasable forward direct drive therebetween and a reverse drive therebetween in response respectively to manipulation of said transmission in effecting forward and reverse driving directions of said driving shaft, and means for mounting one of said clutching structures on said driven shaft.

17. In a drive for a motor vehicle having a power driving means and a shaft driven therefrom and adapted to drive said vehicle, a speed ratio changing transmission including a driving shaft intermediate said power driving means and said driven shaft, said transmission including means adapted to be manipulated for driving said driving shaft in a plurality of forward speed ratios and in reverse, overdriving means including a countershaft laterally offset from one of said shafts for driving said driven shaft from said power driving means at a speed greater than the speed of said driving shaft, a speed responsive clutch controlling said overdriving means and including positively engageable clutching structures respectively adapted for driving connection to said driven shaft and to said countershaft and power driving means at least when said structures are clutched, said speed responsive clutch being adapted to automatically drivingly connect said power driving means with said driven shaft through the intermediary of said countershaft, means drivingly connected to said driving and driven shafts for selectively transmitting a releasable forward direct drive therebetween and a reverse drive therebetween in response respectively to manipulation of said transmission in effecting forward and reverse driving directions of said driving shaft, one of said clutching structures including a centrifugal force operated clutching element, and means for mounting said clutching element on said driven shaft.

18. In a vehicle drive, power driving means including a driving shaft, means including a shaft driven by said power driving means and adapted to drive the vehicle, direct driving means including a releasable clutch for driving said driven means from said driving shaft and for releasing the drive to provide relative rotation between said driving and driven shafts, auxiliary means including a countershaft offset from the axis of one of said shafts for driving said driven means independently of said drive through said direct driving means and at a speed greater than that of said driving means, a second clutch operably associated with said auxiliary driving means and adapted to control the drive between said driving means and said auxiliary driving means, manually controlled means for reversing the direction of drive of said driving shaft, and means operable to drivingly couple said driving shaft to said driven means for a reverse drive in response to actuation of said manually controlled means accompanied by a reverse drive of said driving shaft.

19. A drive for motor vehicles comprising, aligned driving and driven shafts, an intermediate shaft aligned with said driving and driven shafts, means for driving said intermediate shaft in forward speed ratios and reverse from said driving shaft, means for overdriving said driven shaft including a countershaft gear train operably connected to said driving and driven shafts, speed responsive synchronous positive clutch means operably interposed in said countershaft gear train for controlling the overdrive therethrough, and means including clutching members drivingly connected to said driven and intermediate shafts for selectively transmitting a releasable forward direct drive and a reverse drive therebetween.

20. A drive for motor vehicles comprising, aligned driving and driven shafts, an intermediate shaft aligned with said driving and driven shafts, means including a countershaft laterally offset from said intermediate shaft for driving said intermediate shaft in forward speed ratios and reverse from said driving shaft, means including said countershaft for overdriving said driven shaft from said driving shaft, speed responsive synchronous positive clutch means operably interposed in said countershaft gear train for controlling the overdrive therethrough, and means drivingly connected to said driven and intermediate shafts for selectively transmitting a releasable forward direct drive and a reverse drive therebetween.

21. In a motor vehicle drive, aligned driving, driven, and intermediate shafts, a countershaft geared to said driving shaft and adapted to clutch with said driven shaft, said countershaft spanning said intermediate shaft, direct forward driving means releasably coupling said intermediate and driven shafts, and speed responsive clutch means including clutch parts drivingly connected with said driven shaft and countershaft respectively for coupling said countershaft to said driven shaft, said driving shaft and countershaft when so coupled to said driven shaft transmitting an overdrive to said driven shaft with respect to said driving and intermediate shafts, said intermediate shaft being automatically coupled to said driven shaft by said releasable direct driving means in response to declutching of said speed responsive clutch means.

22. In an automotive vehicle, a drive system therefor comprising a drive shaft connected to the engine of the vehicle and a driven shaft associated with the road wheels of the vehicle, selectively operable mechanism associated with said shafts for driving said vehicle either rearwardly or forwardly, said mechanism operable for driving said vehicle forwardly including means operable for providing a normal driving connection between said shafts with automatically operable means operable for driving said driven shaft at a rate faster than that provided by said normal driving means, said automatically operable means including a countershaft offset laterally from one of said shafts and adapted to receive a drive from said drive shaft, and means operable when it is desired to drive said vehicle rearwardly for locking out said automatic means.

23. In a power transmission for a motor vehicle having power driving means including a driving shaft and a shaft driven therefrom and adapted to drive the vehicle, said driving and driven shafts being co-axially arranged for relative rotation, an overrunning clutch including inner and outer clutch members one of which is adapted to be driven by said driving shaft and the other of which is adapted to drive said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with respect to said shafts, a second clutching structure having a centrifugal force actuated pawl adapted for engagement in said slot to positively couple said clutching structures when the rotational speeds thereof are substantially the same, means for drivingly connecting one of said clutching structures to said power driving means, means for drivingly connecting the other of said clutching structures to said driven shaft, one of said driving connecting means including a gear train, said clutching structures being driven at relatively different speeds when the driving shaft drives the driven shaft through said overrunning clutch, clutch teeth drivingly connected to said driven shaft, shiftable clutch teeth drivingly connected to said driving shaft, and manually operable means for shifting said shiftable clutch teeth relative to said clutching structures to engage the first said clutch teeth for drivingly connecting said driving and driven shafts independently of said overrunning clutch.

24. In a power transmission for a motor vehicle having power driving means including a driving shaft and a shaft driven therefrom and adapted to drive the vehicle, said driving and driven shafts being co-axially arranged for relative rotation, an overrunning clutch including inner and outer clutch members one of which is adapted to be driven by said driving shaft and the other of which is adapted to drive said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with respect to said shafts, a second clutching structure having a centrifugal force actuated pawl adapted for engagement in said slot to positively couple said clutching structures when the rotational speeds thereof are substantially the same, means for drivingly connecting one of said clutching structures to said power driving means, means for drivingly connecting the other of said clutching structures to said driven shaft, one of said driving connecting means including a gear train, said clutching structures being driven at relatively different speeds when the driving shaft drives the driven shaft through said overrunning clutch, manually engageable clutch means including clutching elements respectively drivingly connected to said driven shaft and to said driving shaft, one of said clutching elements being shiftable relative to said clutching structures and manually operable means for shifting the last said clutching element into engagement with the other of said clutching elements.

EDWIN R. MAURER.

CERTIFICATE OF CORRECTION.

Patent No. 2,154,575. April 18, 1939.

EDWIN R. MAURER.

It is hereby certified that error appears in the printed specification of the above numbered patent requiring correction as follows: Page 8, first column, line 28, claim 14, after the word "driven" insert clutch; and that the said Letters Patent should be read with this correction therein that the same may conform to the record of the case in the Patent Office.

Signed and sealed this 30th day of May, A. D. 1939.

Henry Van Arsdale (Seal)                         Acting Commissioner of Patents.